(12) United States Patent
Fairchild

(10) Patent No.: US 7,671,280 B1
(45) Date of Patent: Mar. 2, 2010

(54) BIRD GUARD

(75) Inventor: Dana M. Fairchild, Armour, SD (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 531 days.

(21) Appl. No.: 11/680,030

(22) Filed: Feb. 28, 2007

(51) Int. Cl.
*H02G 7/00* (2006.01)

(52) U.S. Cl. .............................. 174/138 R; 174/138 F; 174/45 R; 174/5 R; 174/139; 174/135; 52/101; 119/174

(58) Field of Classification Search ............... 174/138 F, 174/138 R, 45 R, 5 R, 5 SB, 40 R, 139, 135, 174/186; 52/101; 119/174, 537
See application file for complete search history.

(56) References Cited

U.S. PATENT DOCUMENTS

| | | | |
|---|---|---|---|
| 2,414,732 A | 1/1947 | Fox | |
| 5,291,707 A | 3/1994 | McDonald | |
| 5,615,524 A | 4/1997 | Costa, Sr. | |
| 5,873,324 A | 2/1999 | Kaddes et al. | |
| 6,005,196 A | 12/1999 | Spillyards | |
| 6,018,453 A * | 1/2000 | Daharsh et al. | ............. 361/117 |
| 6,730,852 B1 | 5/2004 | Puigcerver et al. | |
| 6,812,400 B1 | 11/2004 | Lynch | |
| 7,297,869 B2 * | 11/2007 | Hiller et al. | ............... 174/40 R |
| 7,432,449 B2 * | 10/2008 | Kim | ......................... 174/138 F |
| 7,538,277 B2 * | 5/2009 | Spencer | ................... 174/138 F |

\* cited by examiner

*Primary Examiner*—Dhiru R Patel
(74) *Attorney, Agent, or Firm*—Joy Alwan; Mark P. Dvorscak; Paul A. Gottlieb

(57) ABSTRACT

The bird guard provides a device to protect electrical insulators comprising a central shaft; a clamp attached to an end of the shaft to secure the device to a transmission tower; a top and bottom cover to shield transmission tower insulators; and bearings to allow the guard to rotate in order to frighten birds away from the insulators.

18 Claims, 9 Drawing Sheets

BIRD GUARD

CONTRACTUAL ORIGIN OF THE INVENTION

The United States Government has rights in this invention pursuant to the employer-employee relationship between the Government and the inventor.

BACKGROUND OF THE INVENTION

1. Field of the Invention

The invention is a device to protect the insulators on the towers of high voltage electrical transmission lines.

2. Background

On high power transmission lines, the insulators prevent the lines from contacting the metal towers which support the lines. Contract between the tower and the transmission line results in a short circuit disrupting electric service. Many birds find transmission lines and towers to be irresistible perches. Bird droppings are highly conductive. Over a period of time, the accumulation of bird droppings will conduct a current over the insulators causing a short circuit.

Large birds of prey pose a greater threat to transmission lines than the majority of birds. These predators use the towers as hunting perches. Typically when these birds leave their perches, they face into the wind and defecate a long stream of fecal material. The stream can often bridge the insulators and short circuit the transmission line. In the western United States, repair crews travel hundreds of miles to repair the damage caused by bird droppings.

U.S. Pat. No. 6,812,400 discloses a dielectric device which encloses a power line at the point of contact with an insulator to protect from a short circuit.

U.S. Pat. No. 5,291,707 discloses a conical cover to prevent birds from landing on a flue gas exhaust stack.

U.S. Pat. No. 5,615,524 discloses a multi-pronged cover for the mast of a sailing ship to prevent birds from perching on the mast head.

U.S. Pat. No. 5,873,324 discloses a bird guard which fits over and under an insulator on an electric pole to protect the insulator from bird droppings.

U.S. Pat. No. 2,414,732 discloses an electrical protection device which surrounds an insulator. The device includes a sheet of insulating material which is thick enough to prevent birds from pecking through the material to the insulator.

U.S. Pat. No. 6,730,852 discloses a flexible polymer cover for an electrical power line that fits above an insulator. The cover protects the insulator from bird droppings.

U.S. Pat. No. 6,005,196 discloses a hinged cylindrical guard activated by a trigger mechanism. When activated the guard closes to surround a transformer bushing terminal to prevent wildlife from shorting the circuit.

None of the above patents disclose devices of sufficient size to protect the series of insulators used on high power electrical transmission lines.

None of the above patents disclose devices designed to prevent birds from perching on electrical transmission towers directly above insulators.

None of the above patents disclose a device to frighten birds away from the sections of a tower containing insulators.

SUMMARY OF THE INVENTION

It is a primary object of the invention to provide a guard to protect the insulators of electrical transmission lines from bird droppings.

It is an objective of the invention to discourage the birds from landing near the insulators.

It is an object of the present invention to provide a light weight, easily installed guard.

Briefly, the bird guard is a device to protect insulators by attaching a weather resistant, non-conductive material to the arm of a power transmission line directly above the insulators. The guard provides an umbrella shield for the insulators. The guard is attached to the arm so that it rotates in wind currents.

BRIEF DESCRIPTION OF THE DRAWINGS

The device together with the above and other objectives and advantages will be best understood from the following detailed description and accompanying drawings.

DESCRIPTION OF THE INVENTION

The inventor has designed a guard for insulators on high power electric transmission lines which not only protects the insulators but repels birds attempts to land on the transmission towers.

Figure 1:
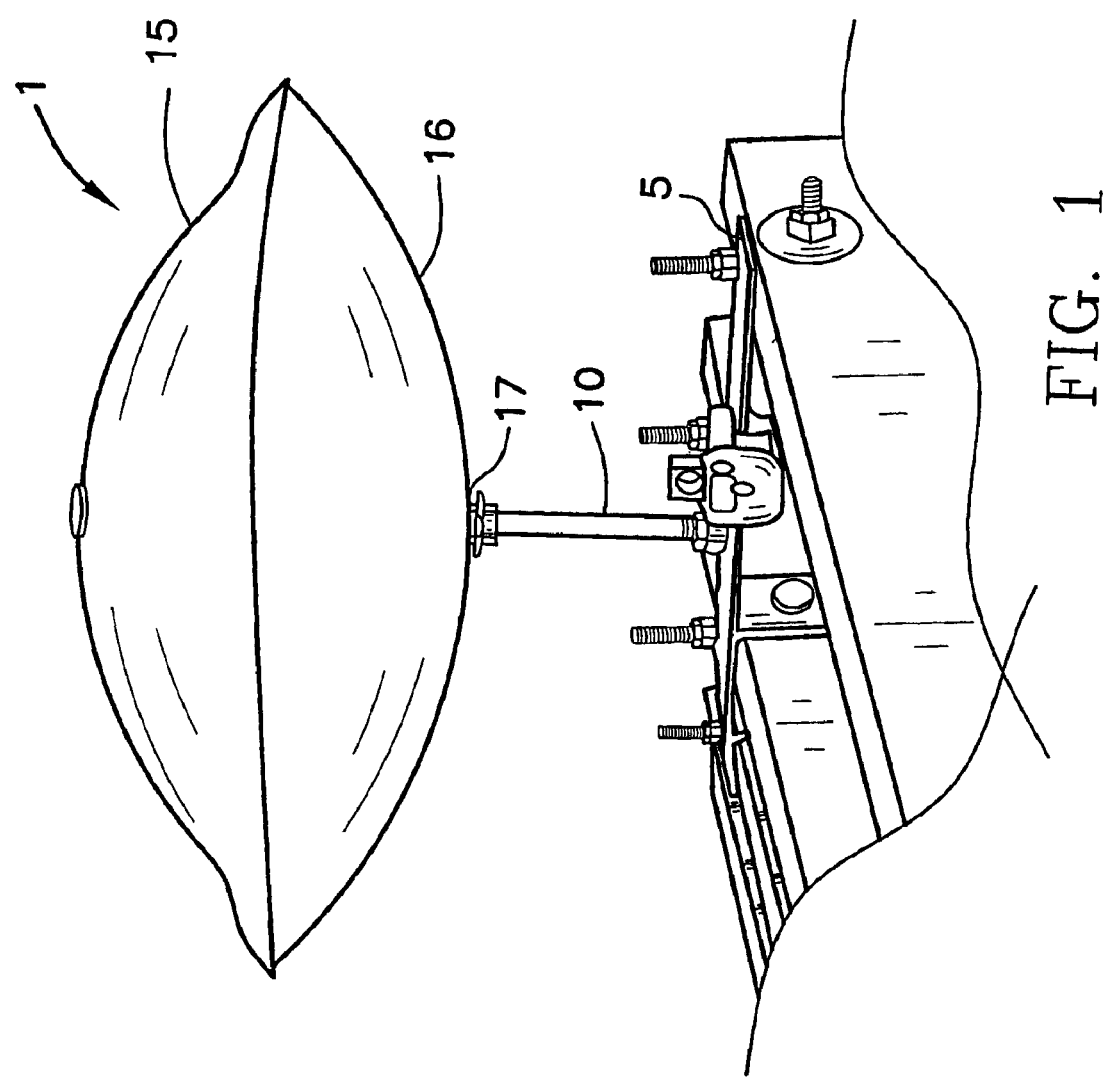
FIG. 1 shows a side view of the device and clamp.
Figure 2:
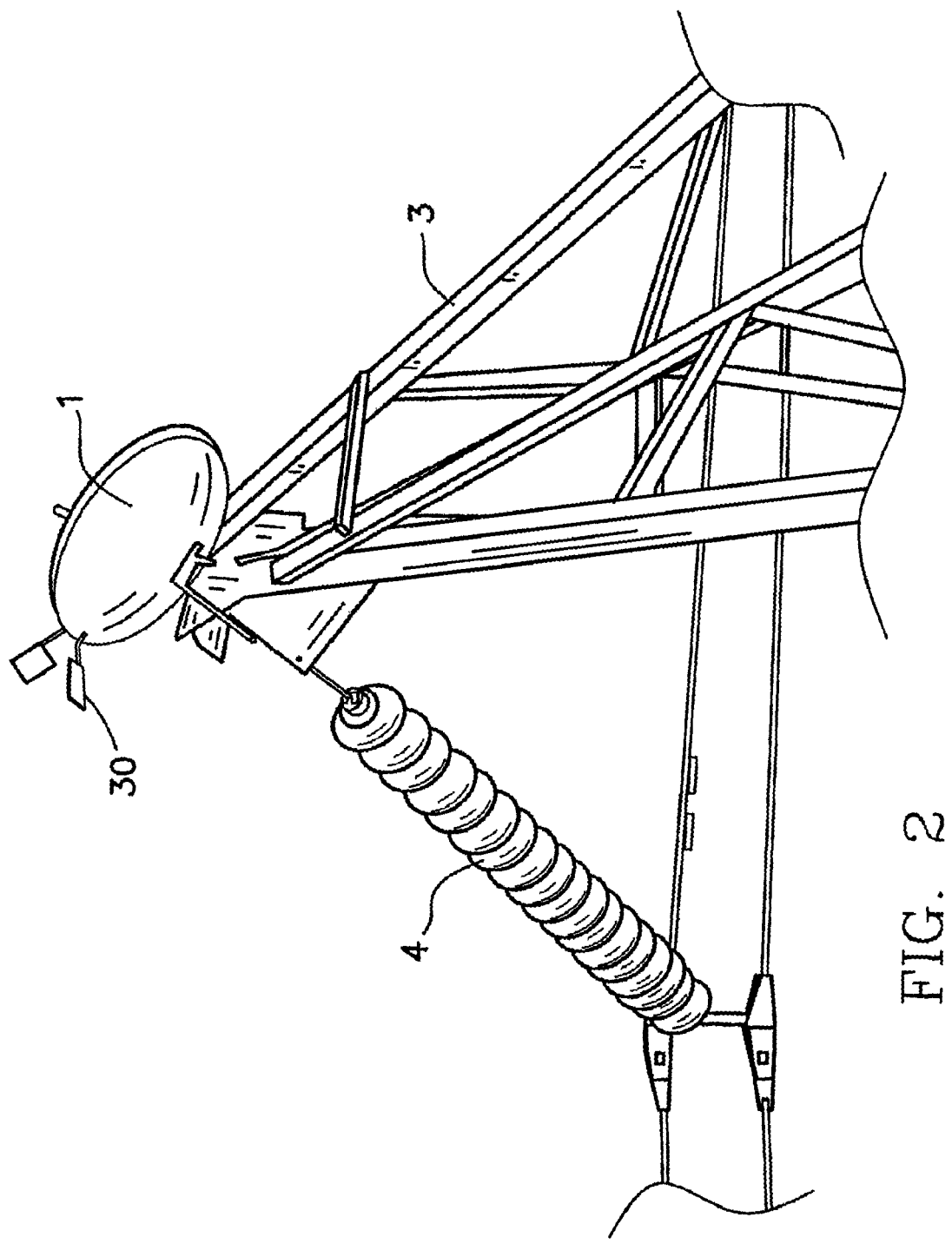
FIG. 2 shows a side view of the device attached to a high power transmission tower and insulator series.
Figure 3:
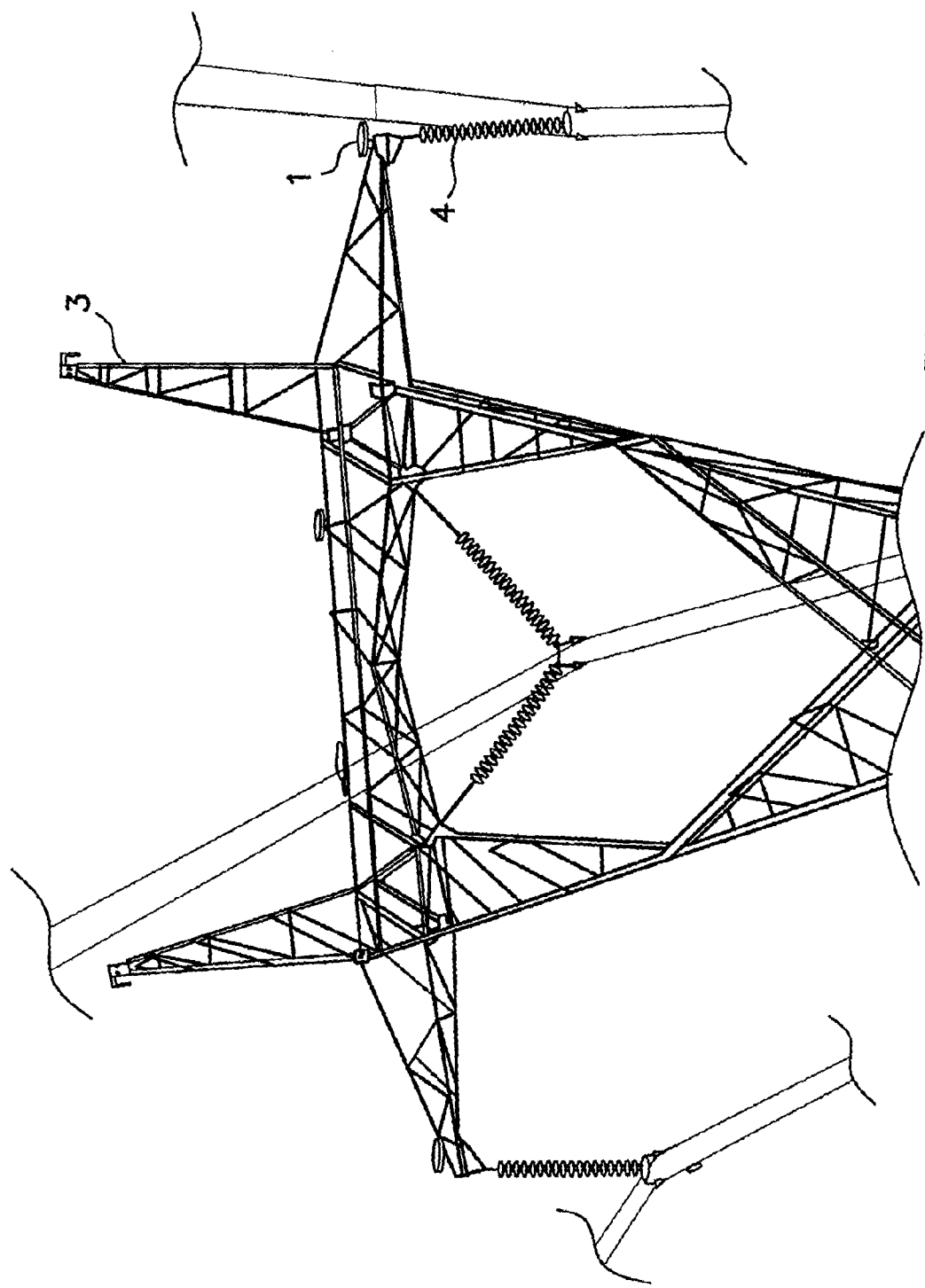
FIG. 3 shows a distant view of two devices attached to a tower.
Figure 4:
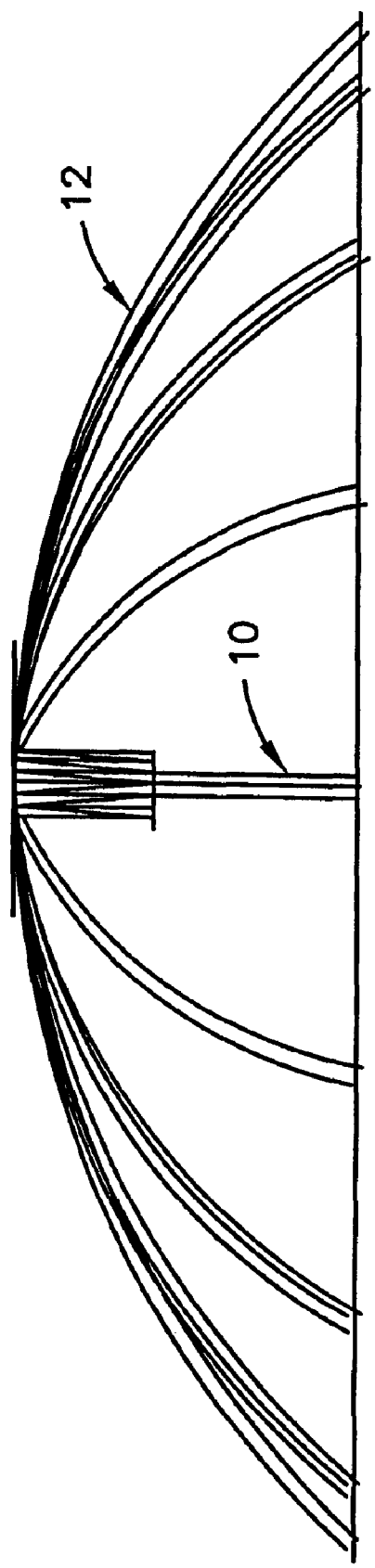
FIG. 4 shows a side view of the frame and two shafts.
Figure 5:
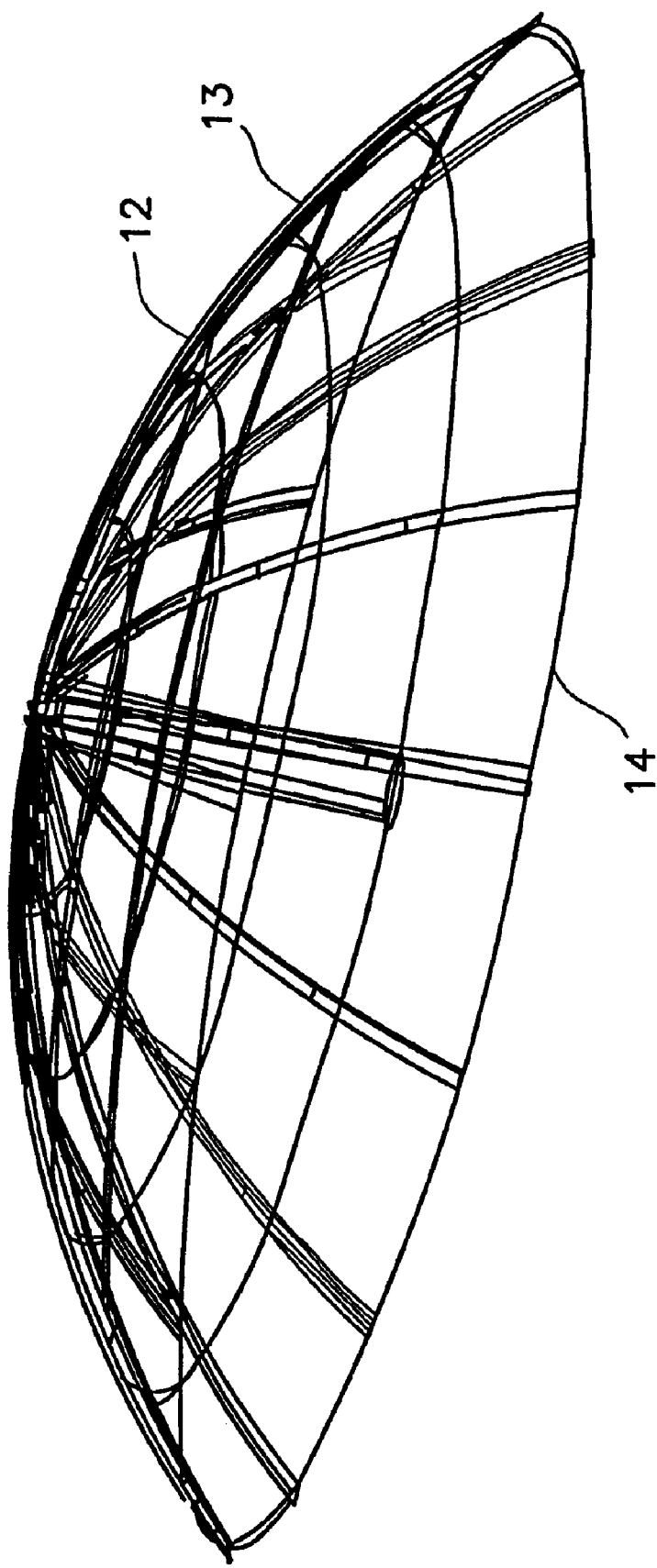
FIG. 5 shows a side view of the frame with horizontal supports.
Figure 6:
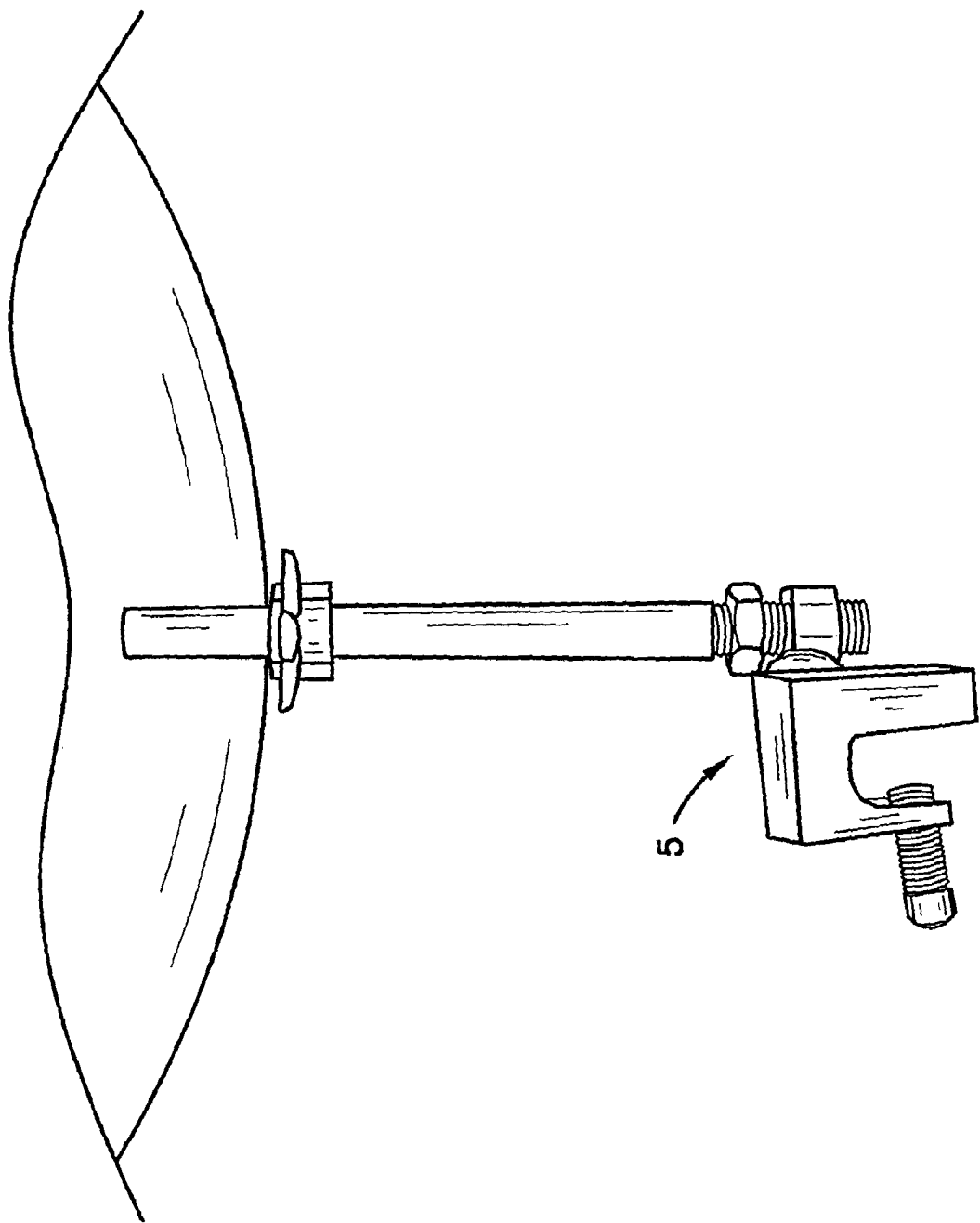
FIG. 6 shows a side view of the clamp.

The guard (1) of FIG. 1 is designed to be attached to a high power transmission tower (3) of FIG. 2. The guard is attached directly above power line insulators (4) in order to protect the insulators from damage by birds.

In the preferred embodiment, the guard (1), as shown in FIG. 1, has a central threaded shaft (10) which extends the length of the guard. The shaft can be made of any standard metal or metal alloy. A first end of the shaft extends to a clamp (5) for attaching the guard (1) to an arm of a high power transmission line. A top cover (15) is attached to the opposite end of the central shaft by a central opening in the cover (17). A bottom cover (16) is attached to the shaft (10) so that the top and bottom covers are in rigid communication to prevent a gap forming between the top and bottom covers. The covers are made of plastic or other nonconductive, weather resistant material. It is important that the material be light enough in weight to be moved by wind currents. The material must also be rigid enough to retain its shape rather than be deflected by wind currents. The diameter of the guard is between 25 and 30 inches in order to cover the insulators.

Figure 7:
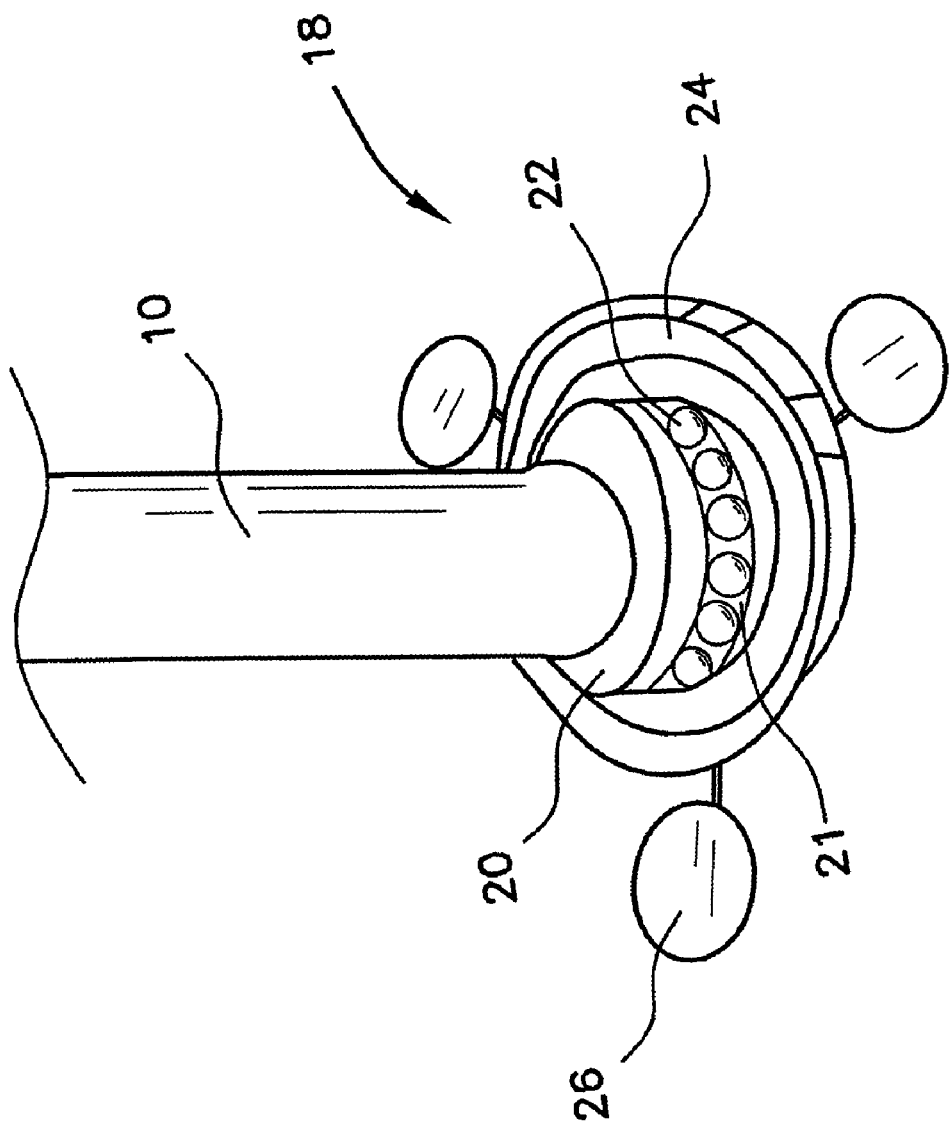
FIG. 7 shows the bearing assembly.

The top (15) and bottom (16) covers are each attached to the shaft (10) by a bearing (18) as shown in FIG. 7. The bearing has a hub (20) threaded onto the shaft (10). The hub has an exterior race (21) containing ball bearings (22). The ball bearings (22) are in fluid communication with a nut (24) attached to central opening (17) on the top (15) and bottom (16) covers. The nut (24) is attached to the top and bottom covers by bolts (26). The bearing (18) allows the top (15) and bottom (16) covers to rotate around the central shaft. Rotational movement is power by wind currents. The movement aids in preventing birds from landing near the guard.

Figure 8:
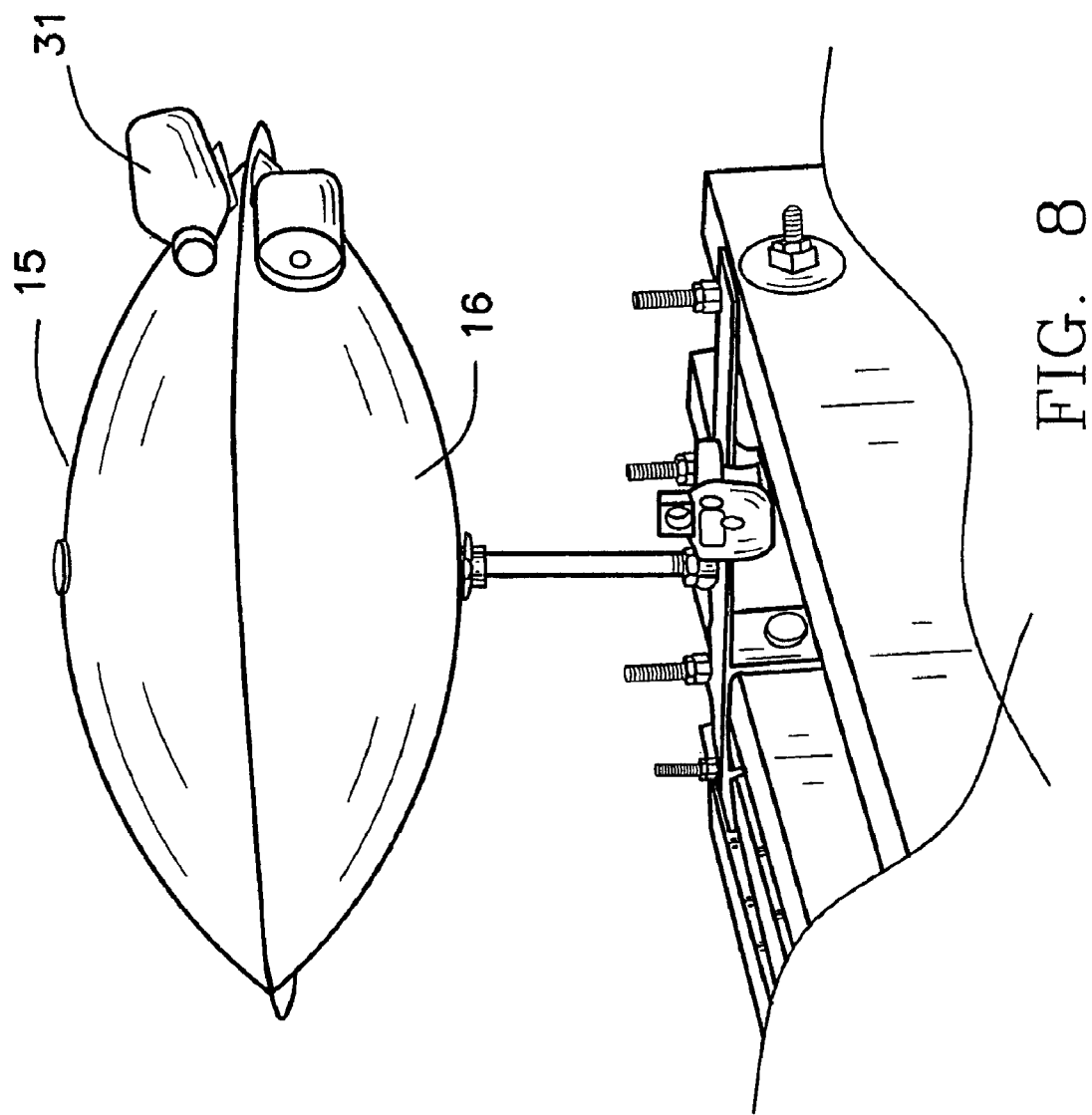
FIG. 8 shows the cylinders.

In a second embodiment, flat blades (30), as shown in FIG. 2, or hollow, open ended cylinders (31), as shown in FIG. 8, are attached to the top (15) and bottom (16) covers. The blades (30) or cylinders (31) are made from a light weight nonconductive material. Their function is to provide extra surface area to catch wind currents.

Figure 9:
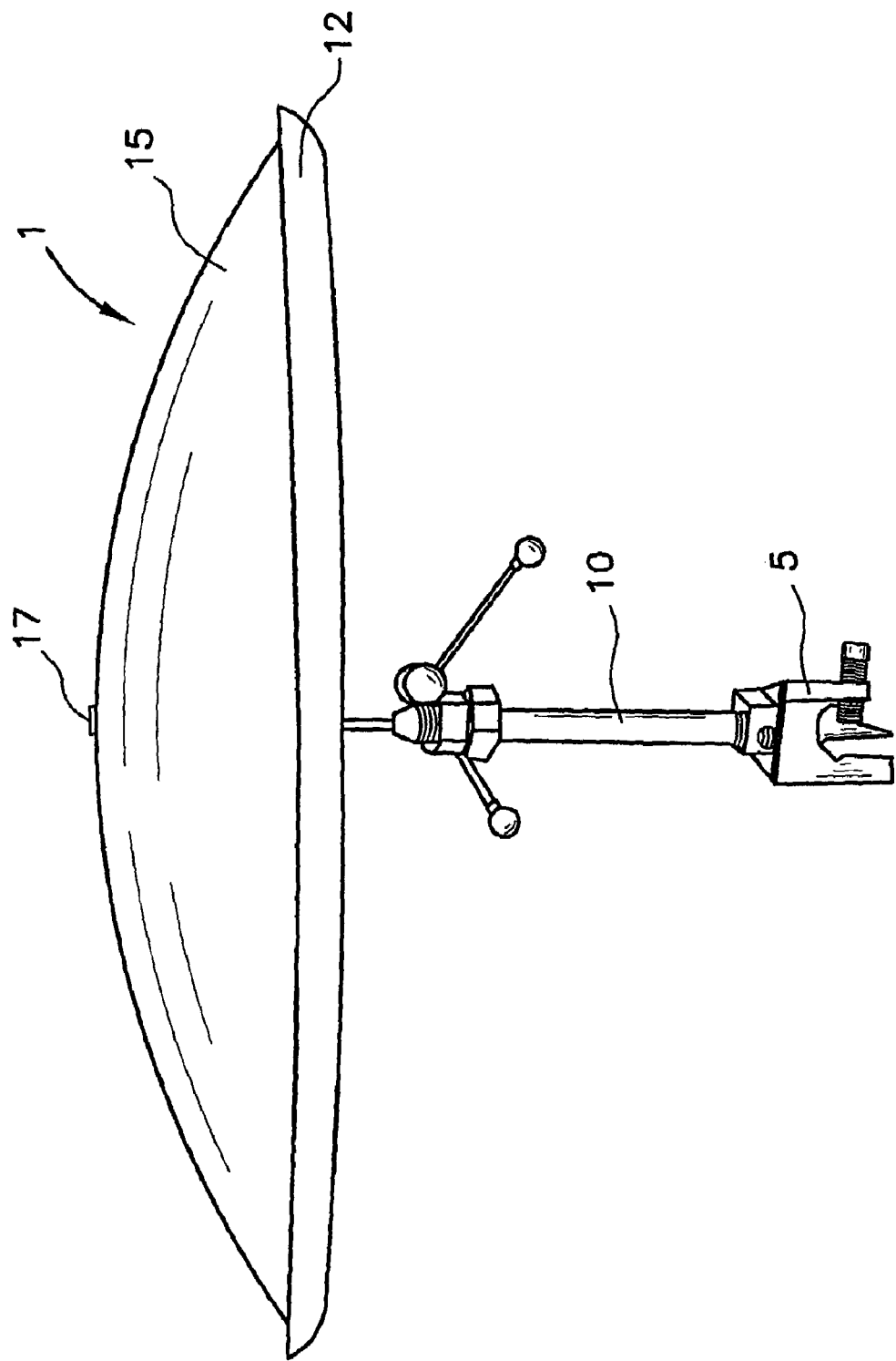
FIG. 9 shows a side view of the third embodiment.

In a third embodiment, the guard (1), as shown in FIG. 9, has a central threaded shaft (10) which extends the length of the guard. The shaft can be made of any standard metal or metal alloy. A first end of the shaft extends to a clamp (5) for attaching the guard (1) to an arm of a high power transmission line (3). A top cover (15) is attached to a frame (12). Both the frame and the top cover have a center opening (17) allowing them to be attached to the shaft (10). The cover is made of plastic or other nonconductive, weather resistant material. It is important that the material be light enough in weight to be moved by wind currents. The material must also be rigid enough to retain its shape rather than be deflected by wind currents.

Both the frame (12) and the top cover (15) are semispherical in shape. The frame is constructed of any light weight metal alloy capable of supporting the cover (15). The frame is constructed of interconnected horizontal (14) and vertical (13) struts as shown in FIG. 9, The top and frame are connected to the shaft by a bearing (18). The bearing has a hub (20) threaded onto the shaft (10). The hub has an exterior race (21) containing ball bearings (22). The ball bearings (22) are in fluid communication with a nut (24) attached to central opening (17) on the top cover (15) and frame (12). The nut (24) is attached to the top and bottom covers by bolts (26). The bearing (18) allows the top cover (15) and frame (12) to rotate around the central shaft. Rotational movement is power by wind currents. The movement aids in preventing birds from landing near the guard.

I claim:

1. A guard to protect electrical insulators comprising:
   a) a central shaft;
   b) a clamp attached to an end of the shaft to secure the guard to a transmission tower;
   c) a top and bottom cover to shield transmission tower insulators; and
   d) a bearing to allow the guard to rotate.

2. The guard of claim 1 where the shaft is threaded.

3. The guard of claim 1 where the top and bottom covers are made of a non-conductive material.

4. The guard of claim 1 where the covers are made of plastic.

5. The guard of claim 1 where the covers are between 25 and 30 inches in diameter.

6. The guard of claim 1 where the bearing comprises a hub, a race and ball bearings fitted within the race.

7. The guard of claim 1 where the bearings holds the top and bottom cover in rigid communication.

8. The guard of claim 1 where blades and cylinders to capture wind currents are attached to the top and bottom cover.

9. The guard of claim 8 where the blades and cylinders to capture wind currents are selected from a group comprising open ended cylinders, flat blades or combinations thereof.

10. A guard to protect electrical insulators comprising:
    a) a central shaft;
    b) a clamp attached to an end of the shaft to secure the guard to a transmission tower;
    c) a top cover to shield transmission tower insulators;
    d) a frame to support the cover; and
    e) a bearing to allow the guard to rotate.

11. The guard of claim 10 where the shaft is threaded.

12. The guard of claim 10 where the top cover is made of a non-conductive material.

13. The guard of claim 10 where the cover is made of plastic.

14. The guard of claim 10 where the cover is between 25 and 30 inches in diameter.

15. The guard of claim 10 where the bearing comprises a hub, a race and ball bearings fitted within the race.

16. The guard of claim 10 where the cover is supported by the frame.

17. The guard of claim 10 where the frame is comprised of horizontal and vertical struts.

18. The guard of claim 10 where the bearing holds the cover and frame to the central shaft.

* * * * *